United States Patent [19]

Reinecke et al.

[11] 4,056,497
[45] Nov. 1, 1977

[54] ACRYLIC ESTER COPOLYMERS CAPABLE OF BEING CROSS-LINKED

[75] Inventors: Rolf Reinecke, Wiesbaden; Karl Josef Rauterkus; Werner Schmieder, both of Kelkheim, Taunus; Eleonore Lutz, Frankfurt am Main, all of Germany

[73] Assignee: Hoechst Aktiengesellschaft, Frankfurt am Main, Germany

[21] Appl. No.: 555,137

[22] Filed: Mar. 4, 1975

Related U.S. Application Data

[63] Continuation of Ser. No. 358,605, May 9, 1973, abandoned.

[30] Foreign Application Priority Data

May 15, 1972    Germany .............................. 2223630

[51] Int. Cl.$^2$ ........................ C08L 33/00; C08L 31/00
[52] U.S. Cl. .............................. 260/29.6 TA; 526/292
[58] Field of Search .................. 260/29.6 F, 29.6 TA, 260/29.6 H; 526/292

[56]    References Cited
        U.S. PATENT DOCUMENTS 3,732,190    5/1973    Balle et al. ...................... 260/78.5 R

*Primary Examiner*—Lucille M. Phynes
*Attorney, Agent, or Firm*—Curtis, Morris & Safford

[57]    ABSTRACT

Acrylic ester copolymers are obtained by copolymerizing acrylic esters with α-haloalkanecarboxylic acid vinyl esters and α, β-ethylenically unsaturated carboxylic acids and optionally other unsaturated monomers in aqueous dispersion. The copolymers can be cross-linked with alkalies after polymerization and may be used as pressure-sensitive adhesives of high heat stability.

4 Claims, No Drawings

ACRYLIC ESTER COPOLYMERS CAPABLE OF BEING CROSS-LINKED

This is a continuation of the now abandoned application Ser. No. 358,605, filed May 9, 1973.

The present invention relates to a process for the preparation of acrylic ester copolymers capable of being cross-linked and to their use as adhesives.

Acrylic ester copolymers capable of being cross-linked are known. The German Offenlegungsschrift No. 1,805,370 and J. Paint Technology 42, page 346 (1970) and J. Paint Technology 42, 45 – 50 (1971) contain a summary of cross-linking possibilities. In principle, two methods of cross-linking may be distinguished:

Cross-linking during the preparation and cross-linking after the preparation.

The cross-linking with polyfunctional monomers, for example, diallyl compounds, diacrylates or dimethacrylates during the preparation leads to copolymers having a determined cohesion, which can, however, not be influenced afterwards. A subsequent cross-linking of copolymer made with reactive monomers has, however, the advantage that the cohesion of the copolymers can, if desired, be controlled. Such reactive copolymers are, for example, hydroxy, epoxy, halohydrine or activated halogen compounds. Copolymers containing these reactive monomers can be cross-linked afterwards with suitable components and, optionally, by adding suitable catalysts. There may be mentioned, for example, the cross-linking of copolymers containing hydroxyl groups with diisocyanates or of copolymers containing epoxy groups with diamines. Depending on the type of reaction (addition or condensation) and on the catalyst system, the cross-linking is carried out at room temperature or at elevated temperature.

Thermal cross-linking methods are not suitable for various application fields because an undesirable discoloration (yellowing) often occurs. In many application fields polymers are more and more used in the form of their aqueous dispersions because of their advantageous processing properties, for example, their being free from odor and solvents. For those synthetic resin dispersions cross-linking methods are desirable which can directly be applied to the dispersion and donot need any thermal activation, the latter fact being interesting for many application purposes of these dispersions.

German Pat. No. 1,204,407 describes aqueous dispersions of acrylic acid esters, monochloroacetic acid vinyl esters and, optionally, further copolymerizable monomers. However, the polymer is mixed after the separation of the aqueous phase, in a similar manner as synthetic rubber, with usual rubber auxiliaries and vulcanized at about 160° C in which case elastomer molding compositions are formed.

The present invention provides a process for the preparation of aqueous copolymer dispersions capable of being cross-linked in the presence of alkalies by polymerization of a mixture of a. 60 to 95% by weight, calculated on the monomer mixture, of at least one acrylic acid ester and/or methacrylic acid ester of a saturated aliphatic alcohol having from 1 to 20 carbon atoms, b. 0 to 40% by weight, calculated on the monomer mixture, of monomers the homopolymers of which have second order transition temperature of from −40° C to +150° C and c. 0.1 to 10% by weight, calculated on the monomer mixture, of an α-haloalkane carboxylic acid vinyl ester of the formula (I)

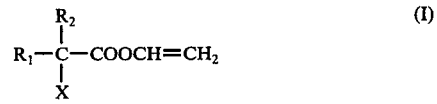

wherein $R_1$ and $R_2$ each represents hydrogen or an alkyl radical having from 1 to 5 carbon atoms and X is fluorine, chlorine, bromine or iodine, in aqueous dispersion in the presence of emulsifiers and/or protective colloids and of free radical initiators, which process comprises using as further reactive monomers d. 0.1 to 10% by weight, calculated on the monomer mixture of, α, β-ethylenically unsaturated carboxylic acids having from 3 to 8 carbon atoms or their partial ester with saturated aliphatic alcohols having from 1 to 20 carbon atoms and e. 0 to 10% by weight, calculated on the monomer mixture, of monomers containing hydroxyl groups and having the formula (II)

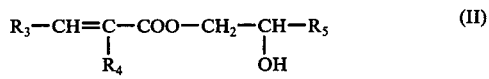

wherein $R_3$ is hydrogen, a methyl group or the group $-COOR_6$, $R_4$ and $R_5$ each is hydrogen or a methyl group and $R_6$ is hydrogen or an alkyl group having from 1 to 12 carbon atoms.

Suitable acrylic acid esters or methacrylic acid esters are the esters of saturated, linear or branched aliphatic alcohols having from 1 to 20 carbon atoms, preferably from 4 to 12 carbon atoms, for example, n-butyl acrylate, iso-butyl acrylate, 2-ethyl-hexyl acrylate, lauryl acrylate and/or laurylmethacrylate.

Further copolymerizable monomers are those the homopolymers of which have a second order transition temperature of from −40° C to +150° C, preferably from 0° to 110° C, and which, under the polymerization conditions, do not react with the monomers of the other groups a), c), d) and e). There may be mentioned, for example, styrene, methyl methacrylate, acrylonitrile, methacrylonitrile, vinyl acetate, vinyl propionate, acrylic amide or methacrylic amide. They are used in an amount of from 0 to 40% by weight, preferably from 0.5 to 25% by weight, calculated on the monomer mixture.

Among the α-haloalkanecarboxylic acid vinyl esters of the formula (I) used in amounts of from 0.1 to 10% by weight, preferably from 0.5 to 8% by weight, calculated on the monomer mixture, there may be mentioned, for example, the monohaloacetic acid vinyl esters and the α-halopropionic acid vinyl esters. The monofluoro, monochloro, monobromo and monoiodoacetic acid vinyl esters, especially the monochloroacetic acid vinyl ester, are preferred.

α, β-ethylenically unsaturated carboxylic acids used as further reactive monomers are, for example, the monocarboxylic acids acrylic acid, methacrylic acid and crotonic acid, the dicarboxylic acids maleic acid and fumaric acid and the semi-esters thereof with alcohols having a chain-length of from 1 to 20 carbon atoms, for example, monomethyl maleate monoisooctyl maleate and mono lauryl maleate, as well as itaconic acid. The monocarboxylic acids, especially acrylic acid, are preferably used. The unsaturated carboxylic acids are used in amounts of from 0.1 to 10% by weight, preferably from 0.5 to 5% by weight, calculated on the monomer mixture.

As monomers of the formula (II) containing hydroxyl groups, there may be used hydroxyethyl acrylate, hydroxyethyl methacrylate, hydroxypropyl acrylate, hydroxypropyl methacrylate, crotonic acid-2-hydroxyethyl ester, 2-ethylhexyl-2-hydroxyethyl maleate or methyl-2-hydroxyethyl maleate. They are used in an amount of from 0 to 10% by weight, preferably from 0.1 to 5% by weight, calculated on the monomer mixture.

The dispersions of the invention are prepared by free radical polymerization of the monomers in aqueous dispersion using emulsifiers, protective colloids and, optionally, regulators, for which purpose the known processes of the dosing technique (pre-emulsification or monomer dosing) are used.

Suitable initiators are inorganic and organic peroxy compounds, for example, ammonium persulfate, potassium persulfate, sodium perphosphate, organic peroxides, for example, dibenzoyl peroxide, peresters, for example, perisooctoates, perisopivalates, optionally in combination with reducing agents, for example, sodium disulfite, sodium formaldehyde sulfoxylate, formamidine sulfinic acid, hydrazine, hydroxylamine and catalytic amounts of accelerating agents, for example, iron salts, cobalt salts, cerium salts and vanadyl salts. The polymerization temperature is within the range of from 0° to +100° C, preferably from 20° to 80° C. The emulsifiers preferably used are anionic ones, for example, alkali metal salts of sulfuric acid semi esters of alkyl phenols or alcohols, in which case the alkyl phenols and alcohols may, optionally, be reacted with small amounts of ethylene oxide, as well as alkyl and aryl sulfonates or sulfo-succinic acid mono and diesters. There may be mentioned, for example, the alkali metal salts of the sulfuric acid semi ester of a nonyl phenol reacted with 4 to 5 mols of ethylene oxide, sodium lauryl sulfate, the sodium salt of a lauryl alcohol ether sulfate with 10 mols of ethylene oxide, sodium dodecylbenzenesulfonate, sodium tetrapropylenebenzene sulfonate or the sodium salt of the sulfosuccinic acid dihexyl ester. These emulsifiers are used in an amount of from 0.1 to 5% by weight, calculated on the sum of the monomers. There may, if desired, also be used nonionic emulsifiers of the type of the oxethylated alkyl phenols, for example, nonyl phenol with 30 mols of ethylene oxide or condensation products of ethylene oxide and propylene oxide. As protective colloids, there may be used, for example, polyvinyl alcohol, poly-N-vinyl pyrrolidone, hydroxyethyl cellulose, carboxymethyl, cellulose or copolymers of maleic acid with vinyl compounds, such as vinyl ethers, styrene, propylene or ethylene in amounts of from 0.01 to 2% by weight, calculated on the sum of the monomers.

The solids content of the dispersions is within the range of from 30 to 70%, preferably from 40 to 60%.

The dispersions of the invention can easily be cross-linked by alkali, the cohesion or the degree of cross-linking being controllable by means of the amount of alkali added or the pH value. By additionally polymerizing monomers containing hydroxyl groups the adhesive and cohesive properties achieved are optimal.

The dispersions so prepared are cross-linked by ammonium hydroxide, alkali metal hydroxide or alkaline-earth metal hydroxide, preferably by sodium hydroxide or potassium hydroxide, which are added to the dispersion in the form of aqueous solutions.

The pH of the dispersion is adjusted from 2 to 3 at the beginning to 6 to 12, preferably to 7 - 11, depending on the cohesion and adhesion desired.

The cross-linked copolymers prepared according to the invention are distinguished by an excellent cohesion. They can be used as intermediate products for lacquers and varnishes, adhesives, pigment binders, non-woven fabric binders and in sealing and coating material. They show a good compatibility with the usual additives, such as pigments, fillers, resins, plasticisers etc.

The copolymers of the invention are especially suitable as pressure-sensitive adhesive for self-adherent floor-coverings, self-adherent labels of paper or metal foil, for cellular plastics materials, wall papers or adhesive tapes. The heat stability of the joints is excellent, the type of rupture, observed after peeling, even et elevated temperature, is adhesion rupture.

The tendency to yellowing of films rendered alkaline is slight. If necessary, the polymers may still be modified by the addition of pigments, fillers or tacky resins.

When preparing the polymers of the invention the general connections between the polymer build-up and its properties known to those skilled in the art should be observed. This especially applies to the second order transition temperature of the copolymer which is adjusted by means of the known methods depending on the purpose for which this copolymer is used. Thus, for each purpose, a polymer with optimal properties can be prepared.

The following Examples illustrate the invention; the parts are by weight, unless stated otherwise:

EXAMPLE 1

A stable monomer emulsion was prepared from
2-ethylhexyl acrylate: 688 parts
acrylonitrile: 74 parts
acrylic acid: 24 parts
monochloroacetic acid vinyl ester: 12 parts
ammonium salt of the sulfuric acid semi-ester of a nonyl phenol oxethylated with 4 - 5 mols of ethylene oxide: 15 parts
water: 400 parts Into a three-necked flask equipped with reflux condenser and thermometer and rinsed with nitrogen, 150 parts of water, 5 parts of the above-mentioned emulsifier and 100 parts of the monomer emulsion were introduced. The mixture was heated to 60° C and the initiator solutions consisting of 0.36 part of ammonium persulfate in 7.5 parts of water and 0.15 part of sodium disulfite in 7.5 parts of water were added.

After 15 minutes, under a nitrogen atmosphere, the residual monomer emulsion was added by doses and so were, at the same time, the initiator solutions consisting of 0.66 part of ammonium sulfate in 60 parts of water and
0.33 part of sodium disulfite in 60 parts of water.

After a 2 hours' after-reaction at 60° C, the mixture was cooled. The pH was adjusted to the value desired with a 5 to 10% sodium hydroxide solution.

The dispersion obtained did not coagulate and was stable. The pH was about 2.5. The solids content of the dispersion was 53.5%.

The following Examples have been carried out in an analogous manner as Example 1, using the following monomer mixtures:

EXAMPLE 2

84% of 2-ethylhexylacrylate, 9.5% of acrylonitrile, 3% of acrylic acid, 3.5% of monochloroacetic acid vinyl ester.

EXAMPLE 3

83% of 2-ethylhexyl acrylate, 9% of acrylonitrile, 3% of acrylic acid, 1.5% of hydroxypropyl methacrylate, 3.5% of monochloroacetic acid vinyl ester.

EXAMPLE 4

85% of 2-ethylhexylacrylate, 9.5% of acrylonitrile, 2.5% of acrylic acid, 2.0% of monochloroacetic acid vinyl ester, 1.0% of hydroxypropyl methacrylate.

EXAMPLE 5

86% of 2-ethylhexyl acrylate, 9.5% of acrylonitrile, 3.0% of acrylic acid, 1.0% of monochloroacetic acid vinyl ester, 0.5% of hydroxypropyl methacrylate.

EXAMPLE 6

85% of 2-ethylhexyl acrylate, 9.5% of methyl methacrylate, 2.5% of acrylic acid, 2.0% of monochloroacetic acid vinyl ester 1.0% of hydroxypropyl methacrylate.

EXAMPLE 7

85% of 2-ethylhexylacrylate, 9.5% of styrene, 2.5% of acrylic acid, 2.0% of monochloroacetic acid vinyl ester, 1.0% of hydroxypropyl methacrylate.

EXAMPLE 8

85% of 2-ethylhexylacrylate, 9.5% of acrylonitrile, 2.5% of acrylic acid, 2.0% of monochloroacetic acid vinyl ester, 1.0% of hydroxyethyl methacrylate.

EXAMPLE 9

85% of 2-ethylhexylacrylate, 9.5% of acrylonitrile, 2.5% of acrylic acid, 2.0% of monochloroacetic acid vinyl ester, 1.0% of hydroxyethyl acrylate.

EXAMPLE 10

85% of 2-ethylhexyl acrylate, 9.5% of acrylonitrile, 2.5% of acrylic acid, 2.0% of monochloroacetic acid vinyl ester, 1.0% of maleic acid methyl-2-hydroxyethyl ester.

EXAMPLE 11

85% of 2-ethylhexyl acrylate, 9.5% of acrylonitrile, 2.5% of acrylic acid, 2.0% of monochloroacetic acid vinyl ester, 1.0% of crotonic acid hydroxyethyl ester.

EXAMPLE 12

84.5% of 2-ethylhexyl acrylate, 9.5% of acrylonitrile, 2.5% of acrylic acid, 2.0% of monochloroacetic acid vinyl ester, 1.5% of maleic acid-2-ethylhexyl-hydroxyethyl ester.

EXAMPLE 13

84.2% of 2-ethylhexylacrylate, 9.4% of acrylonitrile, 2.8% of acrylic acid, 2.8% of monoidoacetic acid vinyl ester, 0.8% of hydroxypropyl methacrylate.

EXAMPLE 14

84.2% of 2-ethylhexylacrylate, 9.4% of acrylonitrile, 2.8% of acrylic acid, 2.8% of acrylic acid, 2.8% of monobromoacetic acid vinyl ester, 0.8% of hydroxypropyl methacrylate.

EXAMPLE 15

94.5% of lauryl methacrylate, 2.5% of acrylic acid, 2.0% of monochloroacetic acid vinyl ester, 1.0% of hydroxypropyl methacrylate.

COMPARISON EXAMPLE 1

86% of 2-ethylhexylacrylate, 9.5% of acrylonitrile, 3.0% of acrylic acid, 1.5% of hydroxypropyl methacrylate.

COMPARISON EXAMPLE 2

87.5% of 2-ethylhexyl acrylate, 9.5% of acrylonitrile, 3.0% of acrylic acid.

COMPARISON EXAMPLE 3

88.5% of 2-ethylhexyl acrylate, 9.5% of acrylonitrile, 2.0% of monochloroacetic acid vinyl ester.

To examine the contact adhesive properties of these polymers, the following testing methods were carried out:

a. Measurement of the resistance to peeling (kp/2.5 cm):

A foil of polyethylene terephthalate of a 2.5 cm × 20 cm dimension was provided with an adhesive layer 0.3 mm thick (application in wet state). After drying, the foil was joined under slight pressure to a carefully cleaned steel sheet. After storage at room temperature for 1 hour the foil was peeled off at a peeling speed of 300 mm/min. at a removing angle of 90°. The aspect of rupture of the bond was also judged.

This measurement was carried out at both +70° C and +10° C.

b. Heat stability (in hours)

A foil of polyethylene terephthalate was coated with the adhesive as described above and joined, after drying of the adhesive layer to a steel sheet in such a manner, that there was an overlapping area of 2.5 cm². The bond was then submitted, at an angle of 0° to a load of 500 g. The measuring temperature was 100°.

The time it took for the bond to rupture was determined.

c. Determination of the degree of cross-linking:

The dispersion and the film obtained from the dispersion were extracted with dioxane. The soluble portion was determined in % by weight of the total solid portion. Taking the experimental error into account, both extraction values were identical.

The properties of the bonds are listed in the following Tables.

| Example | Adjustment of pH | % by weight of soluble portion | Resistance to peeling at 70° C [kp/2.5 cm] (aspect of rupture) | Resistance to peeling at 10° C [kp/2.5 cm] (aspect of rupture) | Heat stability | |
|---|---|---|---|---|---|---|
| 1 | 3 | 100 | 6.0 (c) | 3.25 (a) | 10 | minutes |
|   | 7 | 53 | 0.92 (a) | 2.55 (a) | >24 | hours |

-continued

| Example | Adjustment of pH | % by weight of soluble portion | Resistance to peeling at 70° C [kp/2.5 cm] (aspect of rupture) | Resistance to peeling at 10° C [kp/2.5 cm] (aspect of rupture) | Heat stability |
|---|---|---|---|---|---|
|  | 11 | 35 | 0.64 (a) | 1.14 (a) | >24 hours |
| 2 | 3 | 100 | 6.6 (c) | 2.25 (a) | 15' minutes |
|  | 7 | 30 | 0.8 (a) | 2.40 (a) | >24 hours |
|  | 11 | 15 | 0.4 (a) | 0.82 (a) | >24 hours |
| 3 | 3 | 100 | 6.20 (c) | 2.45 (a) | 30' minutes |
|  | 7 | 25 | 0.8 (a) | 2.30 (a) | >24 hours |
|  | 11 | 10 | 0.54 (a) | 0.80 (a) | >24 hours |
| 4 | 3 | 100 | 6.1 (c) | 2.25 (a) | 20' minutes |
|  | 7 | 35 | 1.9 (a) | 2.85 (a) | >24 hours |
|  | 11 | 15 | 0.41 (a) | 1.02 (a) | >24 hours |
| 5 | 3 | 100 | 6.60 (c) | 1.95 (a) | 15' minutes |
|  | 7 | 40 | 1.90 (a) | 2.60 (a) | >24 hours |
|  | 11 | 25 | 0.90 (a) | 1.20 (a) | >24 hours |
| 6 | 7 | 23 | 0.83 (a) | 1.50 (a) | >24 hours |
| 7 | 7 | 35 | 0.95 (a) | 1.80 (a) | >24 hours |
| 8 | 7 | 35 | 0.88 (a) | 2.50 (a) | >24 hours |
| 9 | 7 | 30 | 0.86 (a) | 2.30 (a) | >24 hours |
| 10 | 7 | 41 | 0.92 (a) | 1.90 (a) | >24 hours |
| 11 | 7 | 35 | 0.82 (a) | 1.90 (a) | >24 hours |
| 12 | 7 | 30 | 0.70 (a) | 2.0 (a) | >24 hours |
| 13 | 7 | 16 | 0.64 (a) | 2.60 (a) | >24 hours |
| 14 | 7 | 25 | 0.65 (a) | 1.50 (a) | >24 hours |
| 15 | 7 | 31 | 0.72 (a) | 1.61 (a) | >24 hours |

Aspect of Rupture: adhesion rupture (a). cohesion rupture(c)

| Comparison Example | Adjustment of pH | % by weight of soluble portion | Resistance to peeling at 70° C [kp/2.5 cm] (aspect of rupture) | Resistance to peeling at 10° C [kp/2.5 cm] (aspect of rupture) | Heat stability |
|---|---|---|---|---|---|
|  | 3 | 100 | 5.8 (c) | 1.4 (a) | 40' minutes |
| 1 | 7 | 100 | 0.55 (a) | 1.04 (a) | 40' minutes |
|  | 11 | 100 | 0.54 (a) | 1.04 (a) | 30' minutes |
|  | 3 | 100 | 4.9 (c) | 1.2 (a) | 10' minutes |
| 2 | 7 | 100 | 0.42 (a) | 1.05 (a) | 20' minutes |
|  | 11 | 100 | 0.33 (a) | 0.9 (a) | 25' minutes |
|  | 3 | 100 | 4.8 (c) | 1.25 (a) | 5' minutes |
| 3 | 7 | 100 | 0.38 (a) | 0.93 (a) | 10' minutes |
|  | 11 | 100 | 0.31 (a) | 0.82 (a) | 15' minutes |

Aspect of rupture: adhesion rupture (a). cohesion rupture (c)

The influence of the pH on the degree of cross-linking can clearly be seen. All monohaloacetic acid vinyl esters and polymers containing α, β-unsaturated acid lead to decreased solubilities with increasing pH.

The comparison examples show that this dependence is due to the combination of reactive monomers. Such an influence of the pH on the solubility of the copolymer is not shown by the sample which is a copolymer of 2-ethylhexyl acrylate/acrylonitrile/acrylic acid, nor by the sample containing additionally copolymerized hydroxypropyl methacrylate, nor by that containing the monohalovinyl ester but no acid.

In addition to the combination of the reactive monomers halogenated ester/acid a content of monomers containing hydroxyl groups has a positive effect on the adhesive and cohesive properties of the copolymer. The degrees of the resistance to peeling measured are still very high at 70° because of the high cohesion, the type of rupture being, in all cases, adhesion rupture (pH adjusted at 7). When the pH was adjusted to 3 only, a cohesion rupture was observed at 70°, as could be expected because the cohesion of the polymer is not sufficient due to the lack of cross-linking.

What we claim is:

1. An aqueous dispersion of a cross-linkable acrylic ester copolymer, said copolymer consisting essentially of
   a. 50 to 95% by weight of monomeric units derived from at least one acrylic acid ester and/or methacrylic acid ester of a saturated aliphatic alcohol having from 1 to 20 carbon atoms,
   b. 0.5 to 25% by weight of monomeric units derived from at least one monomer selected from styrene, methyl methacrylate, acrylonitrile, methacrylonitrile, vinyl acetate, vinyl propionate, acrylic amide and methacrylic amide, said (b) monomer being different from said (a) monomer,
   c. 0.5 to 8% by weight of monomeric units derived from an α-haloalkanecarboxylic acid vinyl ester of the formula

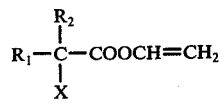

wherein $R_1$ and $R_2$ each is hydrogen or an alkyl radical having from 1 to 5 carbon atoms and X is fluorine, chlorine, bromine or iodine,
   d. 0.5 to 5% by weight of monomeric units derived from at least one α, β-ethylenically unsaturated carboxylic acid having from 3 to 8 carbon atoms or a partial ester thereof with a saturated aliphatic alcohol having from 1 to 20 carbon atoms, and
   e. 0.1 to 5% by weight of monomeric units derived from at least one monomer of the formula

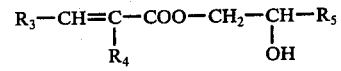

wherein $R_3$ is hydrogen, a methyl group or the group $-COOR_6$, $R_4$ and $R_3$ each is hydrogen or a methyl group and $R_6$ is hydrogen or an alkyl group having from 1 to 12 carbon atoms.

2. An aqueous dispersion of a cross-linkable acrylic ester copolymer, said copolymer comprising
   a. 50 to 95% by weight of monomeric units derived from 2-ethylhexyl acrylate.
   b. 0.5 to 25% by weight of monomeric units derived from acrylonitrile,
   c. 0.5 to 8% by weight of units derived from monochloroacetic acid vinyl ester,
   d. 0.5 to 5% by weight of units derived from acrylic acid, and
   e. 0.1 to 5% by weight of units derived from hydroxypropyl methacrylate.

3. An aqueous dispersion of a cross-linkable acrylic ester copolymer, said copolymer consisting essentially of
   a. 50 to 95% by weight of monomeric units derived from at least one acrylic acid ester and/or methacrylic acid ester of a saturated aliphatic alcohol having from 1 to 20 carbon atoms,
   b. 0.5 to 25% by weight of monomeric units derived from at least one monomer, selected from styrene, methyl methacrylate, acrylonitrile, methacrylonitrile, vinyl acetate, vinyl propionate, acrylic amide and methacrylic amide, said (b) monomer being different from said (a) monomer,
   c. 0.1 to 10% by weight of monomeric units derived from an α-haloalkanecarboxylic acid vinyl ester of the formula $$R_1-\underset{\underset{X}{|}}{\overset{\overset{R_2}{|}}{C}}-COOCH=CH_2$$

wherein $R_1$ and $R_2$ each is hydrogen or an alkyl radical having from 1 to 5 carbon atoms and X is fluorine, chlorine, bromine or iodine,
   d. 0.1 to 10% by weight of monomeric units derived from at least one α, β-ethylenically unsaturated carboxylic acid having from 3 to 8 carbon atoms or a partial ester thereof with a saturated aliphatic alcohol having from 1 to 20 carbon atoms, and
   e. 0.1 to 5% by weight of monomeric units derived from at least one monomer of the formula $$R_3-CH=\underset{\underset{R_4}{|}}{C}-COO-CH_2-\underset{\underset{OH}{|}}{CH}-R_5$$

wherein $R_3$ is hydrogen, a methyl group or the group —$COOR_6$, $R_4$ and $R_5$ each is hydrogen or a methyl group and $R_6$ is hydrogen or an alkyl group having from 1 to 12 carbon atoms.

4. An aqueous dispersion according to claim 1 having a solids content of from 30 to 70% by weight.

* * * * *